United States Patent [19]
Wadahama et al.

[11] Patent Number: 6,024,577
[45] Date of Patent: Feb. 15, 2000

[54] NETWORK-BASED EDUCATION SYSTEM WITH CAPABILITY TO PROVIDE REVIEW MATERIAL ACCORDING TO INDIVIDUAL STUDENTS' UNDERSTANDING LEVELS

[75] Inventors: Toshinari Wadahama; Toshikatsu Kikuchi, both of Kawasaki; Tatsuya Ono, Oita, all of Japan

[73] Assignee: Fujitsu Limited, Kawasaki, Japan

[21] Appl. No.: 08/963,830

[22] Filed: Nov. 4, 1997

[30] Foreign Application Priority Data

May 29, 1997 [JP] Japan .................................. 9-139037

[51] Int. Cl.$^7$ ...................................... G09B 3/00
[52] U.S. Cl. ........................ 434/322; 434/350; 709/204
[58] Field of Search ................... 434/322, 350; 709/204

[56] References Cited

U.S. PATENT DOCUMENTS

| | | | |
|---|---|---|---|
| 5,002,491 | 3/1991 | Abrahamson et al. | 434/322 |
| 5,303,042 | 4/1994 | Lewis et al. | 348/14 |
| 5,437,555 | 8/1995 | Ziu-El | 434/336 |
| 5,727,950 | 3/1998 | Cook et al. | 434/350 |
| 5,788,508 | 8/1998 | Lee et al. | 434/350 |
| 5,823,788 | 10/1998 | Lemelson et al. | 434/350 |

FOREIGN PATENT DOCUMENTS

| | | |
|---|---|---|
| 0 279 558 | 8/1988 | European Pat. Off. . |
| 0 710 942 | 5/1996 | European Pat. Off. . |
| 1 479 379 | 1/1977 | United Kingdom . |
| 2 032 158 | 4/1980 | United Kingdom . |

OTHER PUBLICATIONS

Patent Abstracts of Japan No. 3–146986 published Jun. 21, 1991.

Patent Abstracts of Japan No. 4–082488 published Mar. 16, 1992.

*Primary Examiner*—Kenneth S. Kim
*Attorney, Agent, or Firm*—Staas & Halsey

[57] ABSTRACT

A network-based education system allowing an instructor to give a lecture to a plurality of students via a computer network, where the instructor can grasp the individual students' understanding levels at his/her discretion and take appropriate supplementary actions to the students in accordance with their respective understanding levels. A questionnaire conducting unit conducts a questionnaire to survey the understanding level of each student concerning a class he/she attends. In response to this, a questionnaire responding unit disposed in each student terminal returns an answer to the questionnaire according to response data entered by the student through a keyboard or other input devices. An understanding level data displaying unit, as part of the instructor terminal, collects the responses to the questionnaire returned from the student terminals and displays the distribution of students' understanding levels on a monitor screen of the instructor terminal. This feature allows the instructor to easily grasp the understanding levels of the individual students. Further, the system provides the students with appropriate review material suitable to their respective understanding levels, thereby allowing better supplementary actions to be taken according to each student's understanding level.

7 Claims, 19 Drawing Sheets

53 RESPONSE DATA

| STUDENT ID | CLASSROOM ID | UNIT NAME | UNDER- STANDING LEVEL | COMMENTS |
|---|---|---|---|---|

FIG. 7

54 RESPONSE SUMMARY TABLE

| STUDENT ID | UNDERSTANDING LEVEL | COMMENTS |
|---|---|---|
| A0001 | | |
| A0002 | | |
| A0003 | | |
| A0004 | | |

FIG. 8 (A)

| STUDENT ID | UNDERSTANDING LEVEL | COMMENTS |
|---|---|---|
| A0001 | 3 | I DON'T WELL UNDERSTAND THE DIFFERENCE BETWEEN X AND Y. |
| A0002 | 1 | (NONE) |
| A0003 | 3 | I NEED DETAILED INFORMATION ABOUT X. |
| A0004 | 5 | THE CLASS IS TOO SLOW. |

FIG. 8 (B)

| PERFECTLY UNDERSTAND | MOSTLY UNDERSTAND | PARTLY DIFFICULT | RATHER DIFFICULT | TOO DIFFICULT | NO RESPONSE |
|---|---|---|---|---|---|
| 8 | 15 | 10 | 9 | 5 | 3 |

FIG. 9

| STUDENT ID | UNDER-STANDING LEVEL | COMMENTS |
|---|---|---|
| A0018 | 0 | (NONE) |
| ... | ... | ... |
| A0002 | 1 | (NONE) |
| ... | ... | ... |
| A0025 | 2 | WHAT ABOUT Y IN THE CASE OF Z? |
| ... | ... | ... |
| A0001 | 3 | I DON'T WELL UNDERSTAND THE DIFFERENCE BETWEEN X AND Y. |
| A0003 | 3 | I NEED DETAILED INFORMATION ABOUT X. |
| ... | ... | ... |
| A0029 | 4 | COULD YOU PROVIDE MORE INFORMATION ABOUT Y? |
| ... | ... | ... |
| A0004 | 5 | THE CLASS IS TOO SLOW. |
| ... | ... | ... |

| STUDENT ID | UNIT SUBJECT TO REVIEW |
|---|---|
| A0001 | A02, A03 |
| A0002 | A01, A02, A03, A04 |
| A0003 | A01, A03, A05 |
| A0004 | — |
| A0005 | A05 |

FIG. 13

| QUES-TIONNAIRE NO. 60a | UNDER-STANDING LEVEL 60b | REVIEW MATERIAL 60c | COMMENTS 60d |
|---|---|---|---|
| 001 | 2 | SUPPLEMENTARY MATERIAL 『XXXX』 | SEE MATERIAL "X X X X" |
| 001 | 1 | PROGRAM 『XXXXXX』 | TRY THIS PROGRAMS REVIEW THE LESSONS |
| 001 | 0 | INTRODUCTORY BOOK 『XXXXXXX』 | READ CAREFULLY THIS MATERIAL |
| 002 | 2 | SUPPLEMENTARY MATERIAL 『XXXX』 | SEE MATERIAL "X X X X" XXXXXXXXXXXXXXXXX |
| ⋮ | ⋮ | ⋮ | |

60

F I G. 14

| STUDENT ID | NAME | CLASSROOM ID | OUT-STANDING-QUESTION FLAG | CONTENTS |
|---|---|---|---|---|
| A0005 | Y. Ito | 001 | 0 | XXXXXX |

FIG. 18

NETWORK-BASED EDUCATION SYSTEM WITH CAPABILITY TO PROVIDE REVIEW MATERIAL ACCORDING TO INDIVIDUAL STUDENTS' UNDERSTANDING LEVELS

BACKGROUND OF THE INVENTION

1. Field of the Invention

The present invention relates to a network-based education system that allows an instructor to give a lecture to a plurality of students via a computer network, and also to a computer-readable medium encoded with an instructor-side computer program and/or student-side computer program for implementing a network-based education system. More particularly, the present invention relates to a network-based education system that delivers an instructional course to a plurality of students in a simultaneous fashion, and to a computer-readable medium encoded with an instructor-side computer program and/or student-side computer program for implementing such a network-based education system.

2. Description of the Related Art

The advancement of computer network technologies has made it possible to deliver educational services to different locations at the same time via computer networks. Systems developed for this purpose are called distance learning systems or network-based education systems. A system described in Japanese Patent Application Laid-open Publication No. 8-227266 (1996) is one of such network-based education systems proposed today.

This proposed education system has a database that is constructed beforehand for management of profile information of individual students, including their study items, grades they got in each instructional unit, study progress status, educational careers, and other records. When a student logs in to the education system through a computer network, the system presents appropriate instructional contents for him/her according to the profile information retrieved from the database. The student can request the instructor, at any point of the session, to change the skill level and/or to give other explanations related to the subject. At the end of every instructional unit, the students are graded according to their individual achievements. If some students failed to get an average or higher grade, they will be offered an opportunity to take an interactive counseling service from the instructor, where they will talk about the degree of difficulty concerning the classes and discuss the way to improve the instruction for better understanding.

While the above-described distance education system virtually provides an instructional course to a plurality of students, the class actually proceeds not simultaneously but on an individual student basis. It is therefore impossible for an instructor to check the students' understanding levels at his/her discretion or to take an appropriate support for the students according to their respective understanding levels. In order to compensate for such deficiency, the above education system employs a variety of analyzing functions based on educational psychology to investigate the type of study suitable for individual students and to check carefully the progress of their study. These functions, however, impose heavy data processing loads as well as requesting a large storage capacity to the system. Also, students should interact with the computer, but the system's operability and capability to support individual students are rather limited.

Meanwhile, there are some other systems designed to instruct a plurality of remote students in a simultaneous fashion. Japanese Patent Application Laid-open Publications No. 3-146986 (1991) and No. 4-082488 (1992), for example, disclose network-based education systems of this kind.

In the former system (No. 3-146986), the instructor can see, on his/her monitor screen, the view of his/her students captured by a video camera situated in a distant classroom. When one of the remote students pressed a request switch in an attempt to speak something, the system will automatically bring the focus of the camera on the requesting student, thereby enabling the instructor to take a closer look at the student. This feature helps the participants to talk to each other with the sense of affinity.

In the latter system (No. 4-082488), when a remote student pushed a request switch in an attempt to ask a question, the system automatically delivers the close-up image of the requesting student not only to the instructor terminal but also to other monitors located in different classrooms, thereby allowing other students to participate in the discussion.

The above-described two systems propose the effective use of camera views so that the instructor and students in separate locations may feel an affinity for each other. In those conventional systems, however, it is not easy for the instructor to arbitrarily check the students' understanding levels at his/her discretion, or to give a particular instructional action to the students and watch their responses thereto, which may be possible in an ordinary face-to-face environment where all participants are in the same classroom. It is particularly difficult for the instructor to provide individual students with appropriate material for review purposes that meet their respective understanding levels.

SUMMARY OF THE INVENTION

Taking the above into consideration, an object of the present invention is to provide a network-based education system which allows the instructor to grasp the students' understanding levels easily at his/her discretion and also to take appropriate supplementary actions to the students in accordance with their individual understanding levels. In addition, it is another object of the present invention to provide a computer-readable medium encoded with an instructor-side computer program and/or a student-side computer program designed to implement such a network-based education system.

To accomplish the above objects, according to the present invention, there is provided a network-based education system allowing an instructor to give a lecture to a plurality of students via a computer network. This network-based education system comprises a questionnaire conducting unit disposed at a site of the instructor for conducting a questionnaire to survey understanding levels of the students concerning the lecture; and an understanding level data displaying unit for collecting responses to the questionnaire which are returned from the students and displaying the distribution of the understanding levels described in the responses to the questionnaire.

The above and other objects, features and advantages of the present invention will become apparent from the following description when taken in conjunction with the accompanying drawings which illustrate a preferred embodiment of the present invention by way of example.

BRIEF DESCRIPTION OF THE DRAWINGS

FIG. 7 is a diagram showing an example of response data contents;

FIG. 8(A) is a diagram showing a response summary table that has just been cleared out;

FIG. 8(B) is a diagram showing the response summary table with some data entered;

FIG. 9 is a diagram showing an example of an understanding level summary table;

FIG. 11 is a diagram showing an example of a comment list;

FIG. 13 is a diagram showing an example of the review subject file;

FIG. 14 is a diagram showing an example of a review material file;

FIG. 18 is a diagram showing an example of a questioner list; and

DESCRIPTION OF THE PREFERRED EMBODIMENTS

An embodiment of the present invention will be described below with reference to the accompanying drawings.

Figure 1:
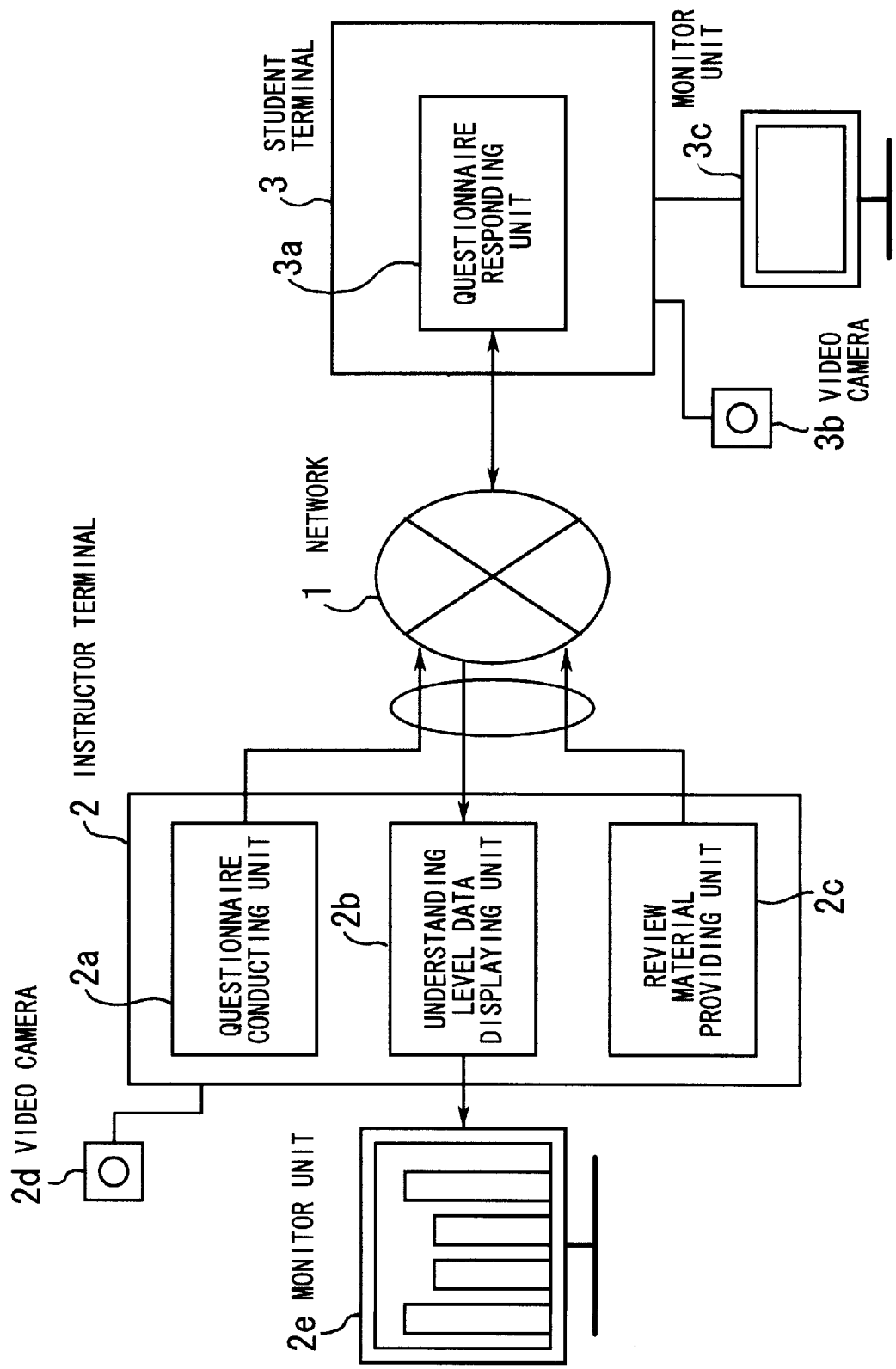
FIG. 1 is a conceptual view of several functions provided in a network-based education system in which the present invention is embodied.

FIG. 1 is a conceptual view of several functions provided in a network-based education system according to the present invention. The system involves an instructor terminal 2 and a student terminal 3, which are linked to each other via a network 1. Further, a number of student terminals, although not shown in FIG. 1, are actually connected to the network 1. The instructor terminal 2 is coupled to a video camera 2d and a monitor unit 2e. The video camera 2d captures a video image of the instructor's face, etc., while the monitor unit 2e shows to the instructor the view of remote students, as well as displaying various data. Similarly, the terminal 3 is coupled to a video camera 3b for capturing video images of students or their classrooms, and also to a monitor unit 3c for showing instructional contents or the instructor's facial image. In addition to the monitors and video cameras, both terminals 2 and 3 are further equipped with other peripherals such as keyboards and speakers, although they are not illustrated in FIG. 1.

In operation of the above-described network-based education system, a questionnaire conducting unit 2a conducts a questionnaire to check the understanding level of each student concerning the classes he/she attends. In response to this, a questionnaire responding unit 3a disposed in the student terminal 3 returns an answer to the questionnaire according to data entered by the student through the keyboard or other input devices. An understanding level data displaying unit 2b, as part of the instructor terminal 2, collects and analyzes the responses to the questionnaire sent from the student terminals and displays the distribution of the students' understanding levels on the screen of the monitor unit 2e, thereby helping the instructor to know the understanding levels of the individual students.

The Instructor terminal 2 has a review material providing unit 2c that provides the students with review material whose content is selected to meet their respective understanding levels, thereby allowing appropriate supplementary actions to be taken according to each student's understanding level.

Figure 2:
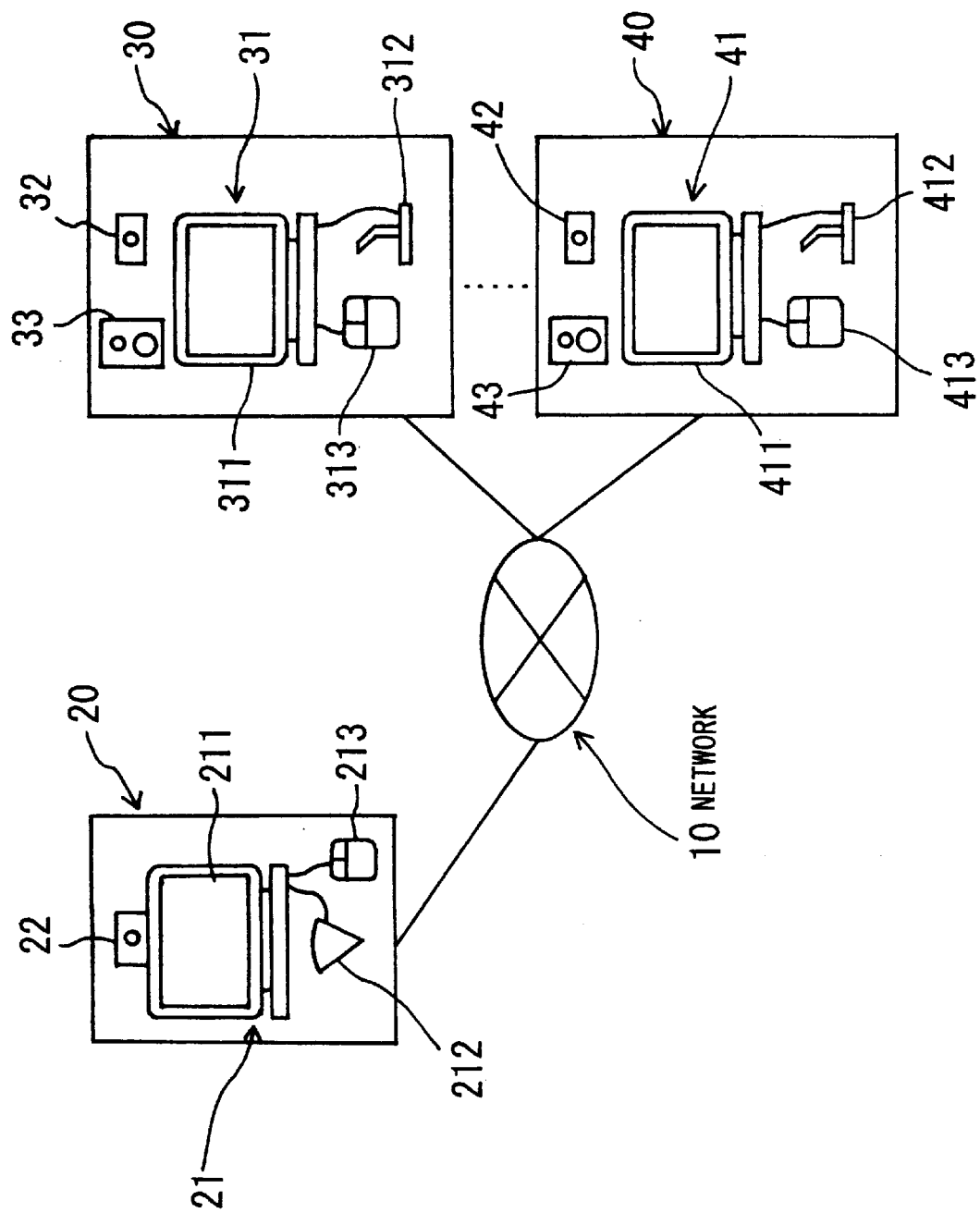
FIG. 2 is a diagram showing the outline of a network-based education system of the present embodiment.

FIG. 2 is a diagram showing the outline of a network-based education system of the present embodiment. A network 10 connects between a terminal 21 located in an instructor's booth 20 and servers (not explicitly shown in FIG. 2) prepared for a plurality of classrooms 30, 40, etc. Student terminals 31, 41, etc. are connected to those servers of the classrooms 30, 40, etc. Here, the terminals 21, 31, and 41 are personal computers, workstations, or other types of computer platforms each equipped with a processor, memory, hard disk, communication port, and the like. The hard disks of the terminals 21, 31, and 41 store several programs to realize various functions required in this network-based education system. These programs are supplied in a computer-readable storage medium such as floppy disks.

The instructor terminal 21 has a monitor unit 211, a head set 212, a mouse 213, and other peripherals such as a keyboard (not shown in FIG. 2). The headset 212 is composed of a microphone section and a headphone section. When the instructor wears this headset 212, the microphone section picks up his/her voice and the headphone section allows him/her to hear the students' voice collected in the classrooms 30 and 40. The instructor terminal 21 is further equipped with a video camera 22 to capture the instructor's image. The captured video image and voice of the instructor are delivered, over the network 10, to the student terminals 31 and 41 in the classrooms 30 and 40, respectively.

The student terminals 31 and 41 are respectively equipped with microphones 312 and 412, mice 313 and 413, and other peripheral devices such as keyboards (not shown in FIG. 2). Each student's voice is picked up by the microphones 312 and 412 and sent to the instructor side via the network 10. There are video cameras 32 and 42 and speakers 33 and 43 in the classrooms 30 and 40, respectively. The video camera 32 and 42 capture the video images of the classrooms 30 and 40. Those video images and voice signals captured in the classrooms are sent to the instructor terminal 21 through the network 10. The speakers 33 and 43 provide the students with the instructor's voice and other audio information.

In the network-based education system configured as above, lectures are conducted by using instructional material displayed on the screens of the monitor units 211, 311, 411, etc., in addition to the instructor's speech. When one instructional unit is completed, the instructor asks the students to answer a questionnaire concerning their understanding levels for that instructional unit. The instructor then collects their answers, and based on the result of this questionnaire, he/she delivers appropriate review material to some of the students as described later. At any moment during the session, students are allowed to ask a question to the instructor by clicking a question button on the monitor screen. Those processes will be now discussed below in detail.

Figure 3:
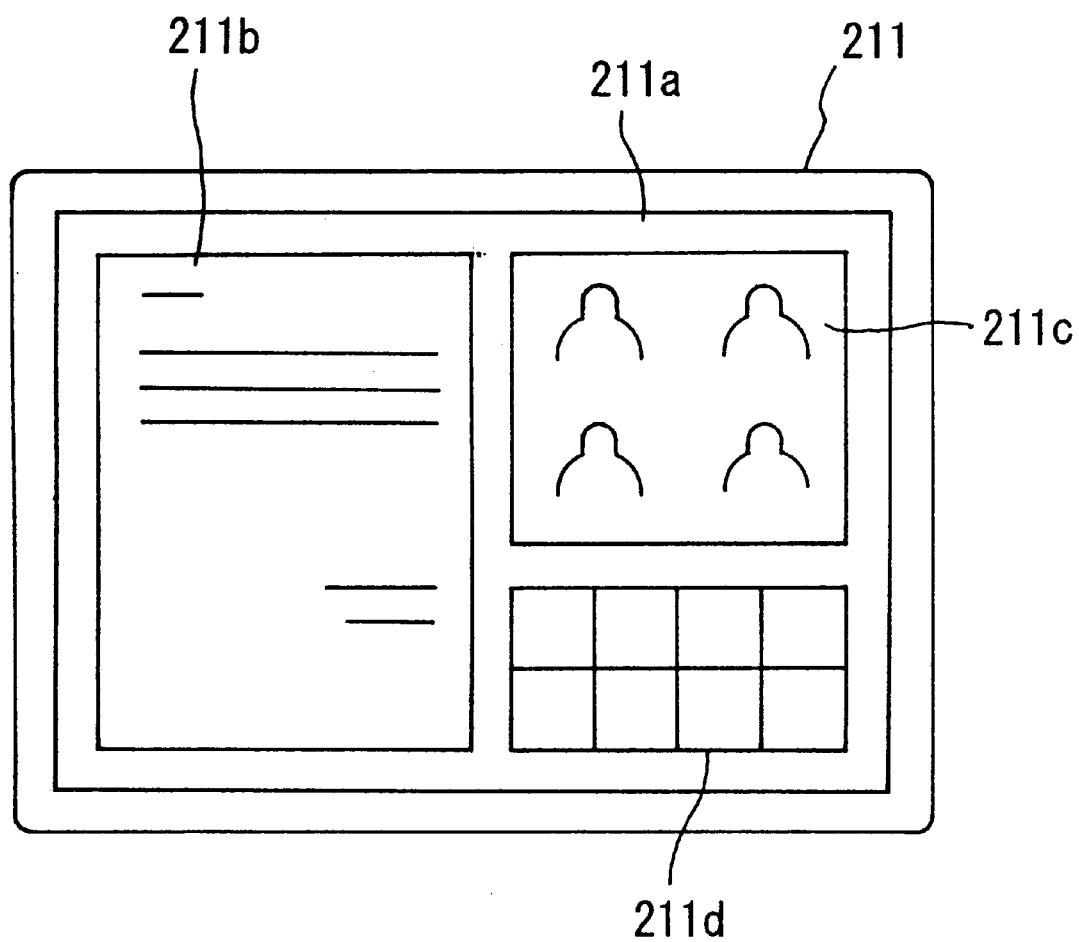
FIG. 3 is a diagram showing a typical monitor screen of an instructor terminal which appears during a class session.

FIG. 3 shows a typical screen displayed on the monitor unit 211 of the instructor terminal 21 during a class session. This screen 211a on the monitor unit 211 consists of a data display area 211b for displaying teaching material, a video window 211c, and an operation menu 211d. The data display area 211b presents the data of various teaching material in accordance with the present instructional content. The video window 211c shows the classrooms 30 and 40 by switching the whole window or dividing the window into multiple sections. The operation menu 211d flexibly displays various operation items for the instructor to conduct a questionnaire and other features as described later. When the instructor clicks the desired menu item by using the mouse 213, the selected operation will be invoked.

Figure 4:
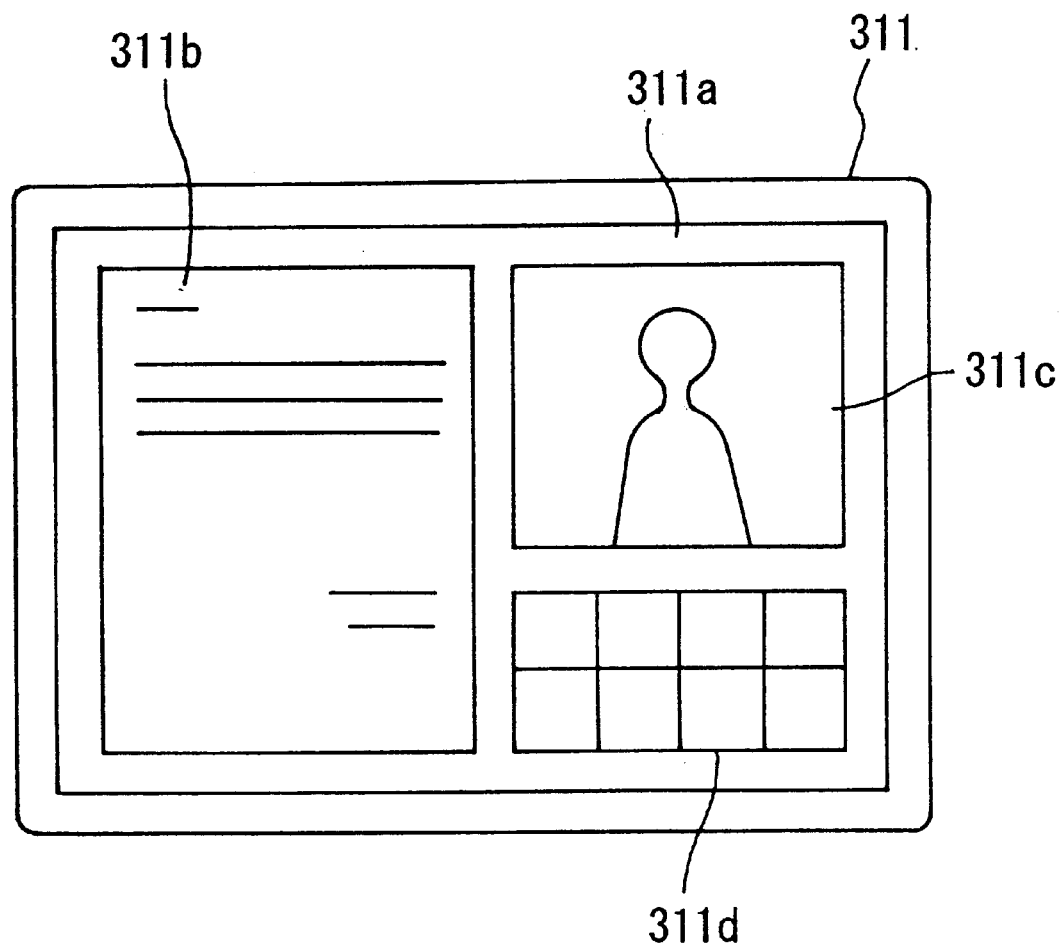
FIG. 4 is a diagram showing a typical monitor screen of a student terminal which appears during a class session.

FIG. 4 shows a typical screen displayed on the monitor unit 311 of the student terminal 31 during a class session. This screen 311a on the monitor unit 311 consists of a data display area 311b for displaying teaching material, a video window 311c, and an operation menu 311d. The data display area 311b presents the data of teaching material relevant to the present instructional content. The video window 311c shows a video image of the instructor. The operation menu 311d flexibly displays various operation items for a student to respond to a questionnaire and the like. A click on the desired menu item by using the mouse 313 will invoke the selected operation. The student terminal 41 provides almost the same display contents as those of the terminal 31, and thus the explanation for the student terminal 41 is omitted here.

Next, the following section will discuss the procedure of an understanding level check as well as a review material presentation process that is performed according to the result of the understanding level check.

The instructor initiates a questionnaire by using voice channels or by sending e-mail messages when he/she needs to know the students' understanding levels during the class. Upon transmission of this questionnaire, an understanding level entry screen appears on the screen of the monitor units 311 and 411 connected to the student terminals 31 and 41, respectively.

Figure 5:
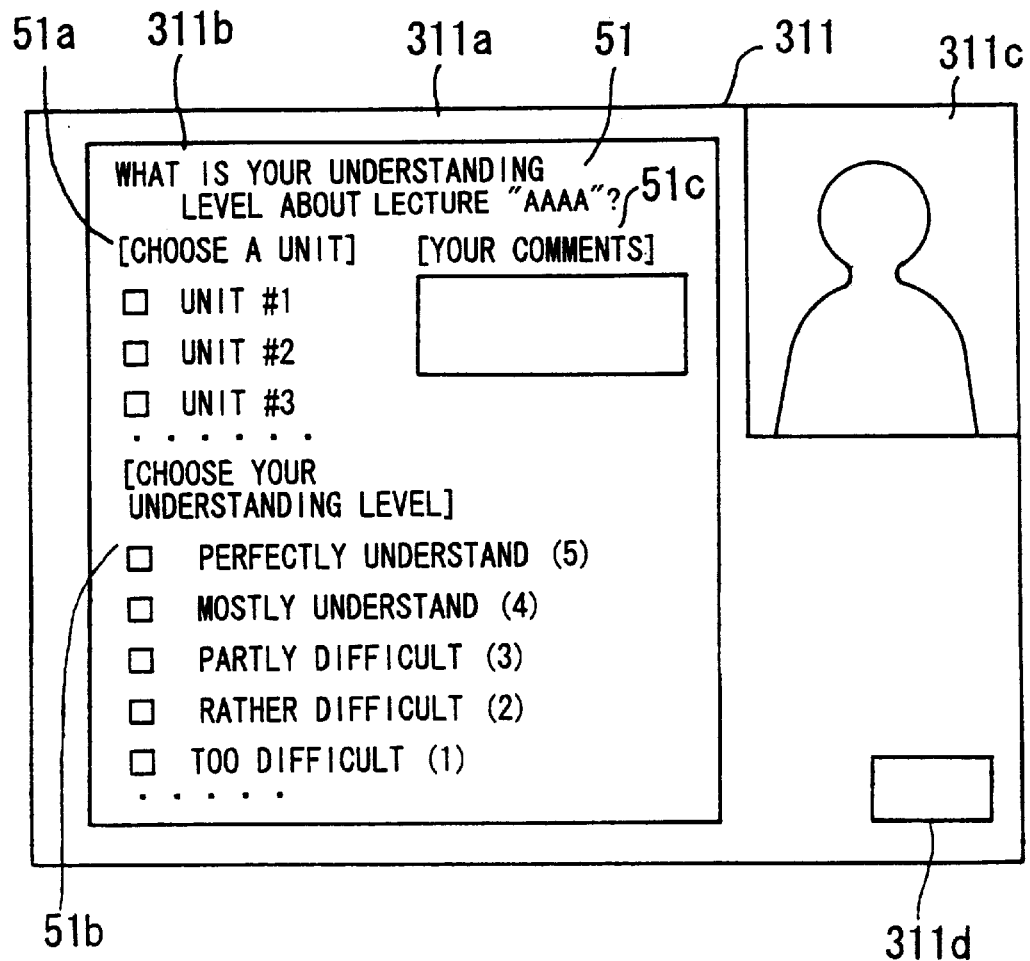
FIG. 5 is a diagram showing an example of an understanding level entry screen displayed on a student terminal.

FIG. 5 shows an example of the understanding level entry screen displayed on the student terminal 31, which assumes that the instructor is requesting the students, via voice channels, to respond to a questionnaire. Now, an understanding level entry screen 51 is displayed within the data display area 311b as part of the screen 311a of the monitor unit 311. With this understanding level entry screen 51, each student specifies an instructional unit from among those listed in a selection menu 51a, and then selects one of five choices of understanding levels listed in another selection menu 51b. Here, the term "instructional unit", or simply "unit", refers to a minimum segment of lectures.

More specifically, the student will select a level "5" if he/she could "perfectly understand" Unit #1. The student will select a level "4" if he/she could "mostly understand" subjects of Unit #1. He/she may select a level "3" if he/she felt it "partly difficult" to understand. Similarly, he/she may select a level "2" if Unit #1 was "rather difficult" for him/her to understand, and select a level "1" if it was "too difficult" to understand. Further, the student can enter his/her comments and suggestions to a comment space 51c through a keyboard and the like. By using the operation menu 311d, the students submit to the instructor side the information entered in the understanding level entry screen 51.

The above-described understanding level entry screen 51 is also displayed on the monitor screens of other student terminals including the terminal 41.

Figure 6:
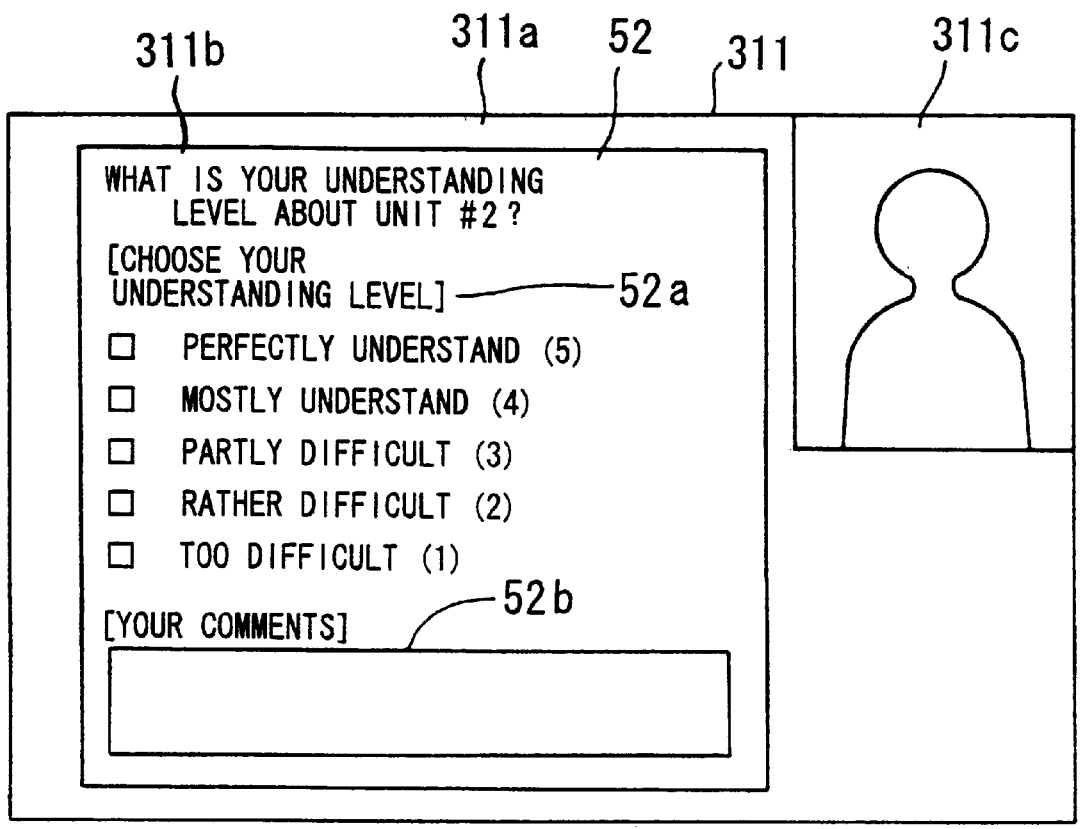
FIG. 6 is a diagram showing another example of an understanding level entry screen displayed on a student terminal.

FIG. 6 shows another example of the understanding level entry screen displayed on the student terminal 31, which assumes that the instructor is requesting, via e-mail, the students to respond to his/her questionnaire. An understanding level entry screen 52 is displayed in the data display area 311b as part of the screen 311a of the monitor unit 311. Note that the unit in question is specified beforehand in this understanding level entry screen 52. With respect to the specified unit, the student selects his understanding level from among five-level choices listed in a selection menu 52a. The contents of this selection menu 52a are the same as those explained in FIG. 5. The student can enter his/her comments and suggestions to a comment space 52b through a keyboard and the like.

When the students have entered their response data to the questionnaire about their understanding levels by filling out the understanding level entry screen of FIG. 5 or FIG. 6, the entered response data is transmitted over the network 10, thereby allowing the instructor terminal 21 to collect responses from the student terminals 31, 41, etc.

FIG. 7 shows an example of the contents of such response data. As shown in FIG. 7, this response data 53 includes each sender's student ID, classroom ID, unit name, understanding level, and comments. Upon receipt of the response data 53 from each student, the instructor terminal 21 complies them to formulate a response summary table.

FIGS. 8(A) and (B) illustrate two states of this response summary table. More specifically, FIG. 8(A) depicts a response summary table whose contents have just been cleared, while FIG. 8(B) shows a response summary table with some data entered therein. The response summary table 54 is produced separately for the different classrooms 30 and 40, and also separately for each instructional unit. The response summary table 54 has three fields, as shown in FIGS. 8(A) and 8(B), for storing student IDs for identifying individual students, understanding levels, and comments from the students. The instructor terminal 21 has a student management file created beforehand, which contains each student's student ID, name, belonging, phone number, e-mail address, etc. The response summary table 54 is produced based on this student management file.

When the instructor terminal 21 begins compilation of the response data 53, it first clears the understanding level field and comment field in the response summary table 54 as illustrated in FIG. 8(A). Each time the response data 53 arrives, the instructor terminal 21 updates each field of the response summary table 54, as well as counting the number of votes given to each understanding level. This results in a summary table 55 as illustrated in FIG. 9. The instructor terminal 21 further produces a graph to visualize the distribution of the students' understanding levels based on the summary table 55, and it displays the produced graph on the screen 211a of the monitor unit 211.

Figure 10:
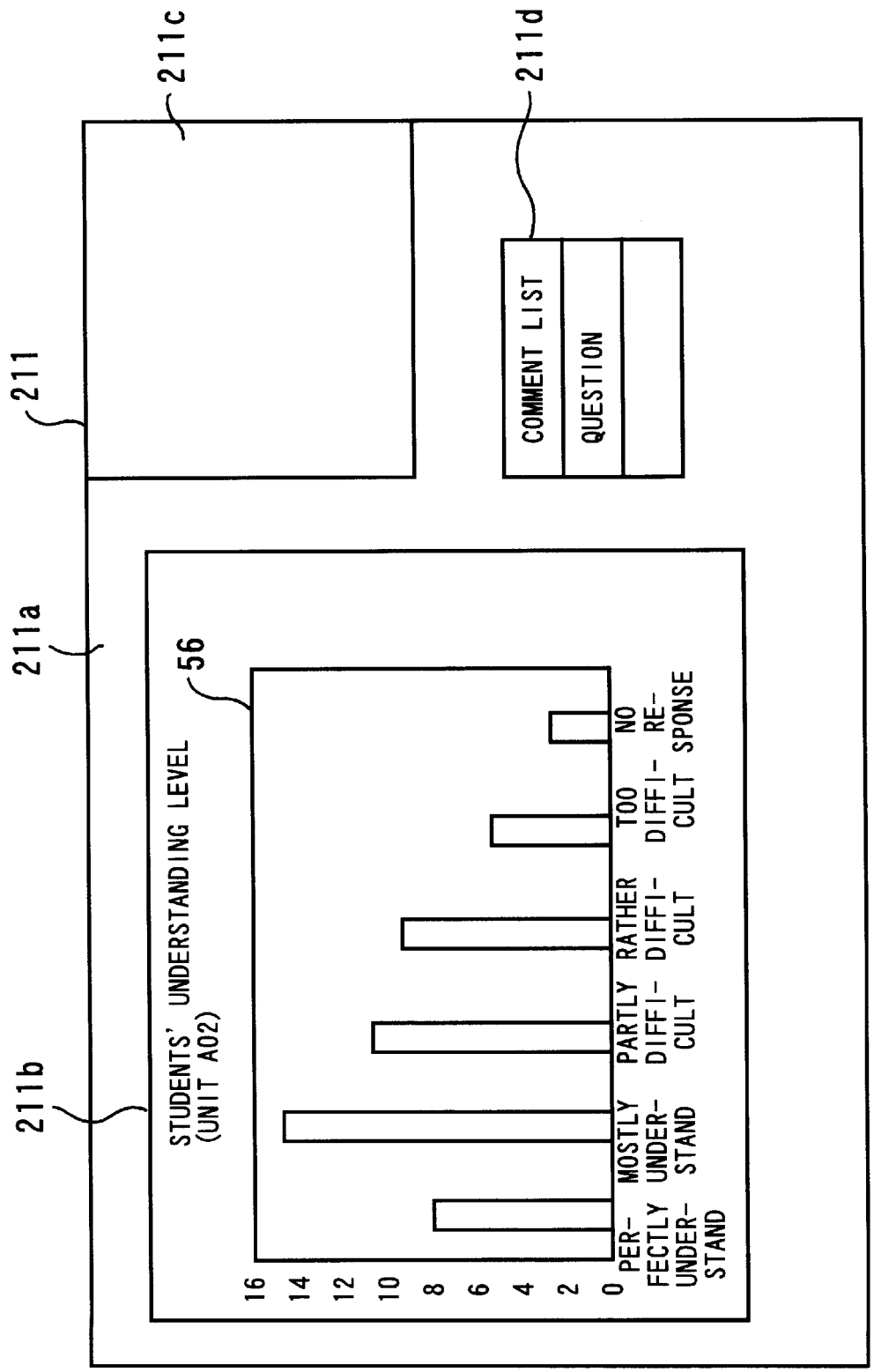
FIG. 10 is a diagram showing a typical graph that indicates the distribution of students, understanding levels.

FIG. 10 is a diagram showing a typical graph of students' understanding levels. This graph 56 is a bar graph chosen for easy understanding, which summarizes the whole response data to enable the instructor to grasp the distribution of the students' understanding levels with a single glance. It is noted, however, that the data representation method used here is not necessarily restricted to the graph form but can be any other form, such as tables, as long as they are comprehensible enough.

In the way described above, the instructor have a total grasp of the students' understanding levels. If the instructor needs to know more about individual students, he/she may click a button named "Comment list" in the operation menu 211d. This operation will erase the graph 56 and, in turn, cause a comment list 57 to appear in the same data display area 211b as illustrated in FIG. 11. The comment list 57 indicates student IDs, understanding levels, and comments. Note that the understanding level "0" shows that the student has returned no response. Preferably, the comment list 57 may include more information about the students, further to the student IDs, such as students' names and classroom IDs.

The graph 56 and comment list 57 are generated for each of the classrooms 30 and 40. The instructor can voluntarily switch the screen to see the understanding levels of the students in each classroom and their comments on the class. The system may optionally be configured so that it will produce and display a list of students who do not respond to the questionnaire, besides the graph 56 and comment list 57.

The class session proceeds in this way while performing a verification of each student's understanding level at every instructional unit. At the end of the class session, the instructor provides some of the students with review material for the units where they could not reach a predetermined understanding level. The following section will focus on this process.

Figure 12:
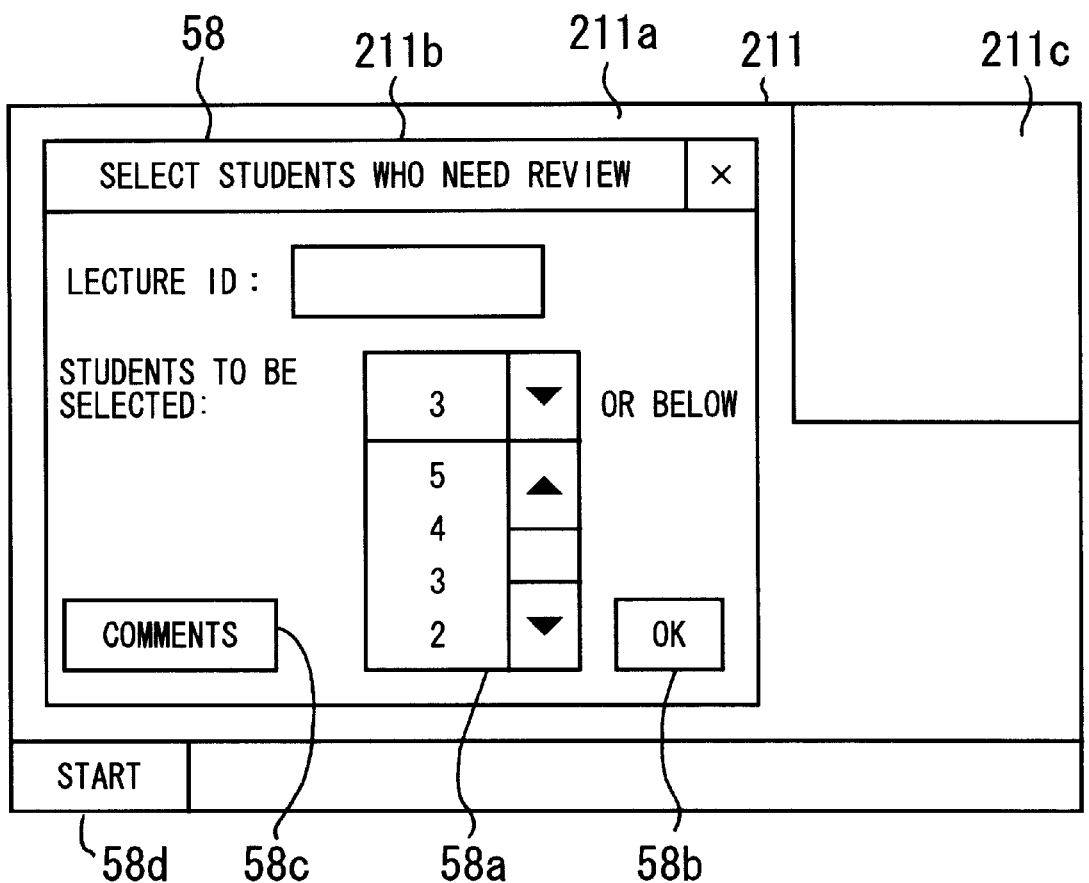
FIG. 12 is a diagram showing an example of a review setting screen designed to determine which students need to review their lessons.

FIG. 12 shows an example of a review setting screen designed to determine who need to review their lessons. This review setting screen 58 appears in the data display area 211b on the screen 211a of the monitor unit 211, and an understanding level setting box 58a is provided as part of the review setting screen 58. The instructor can arbitrarily select a reference level by clicking an upper and lower arrows. Students who have declared the understanding levels equal to or below the selected reference level will be subject to review in each instructional unit. For illustrative purposes, it is assumed here that the students with the level 3 or below are subject to review.

When the instructor finalized this reference level setting and clicked an OK button 58b, the instructor terminal 21 then produces a review subject file for individual students. FIG. 13 shows an example of this review subject file. The instructor terminal 21 extracts, on an individual student basis, such units whose understanding levels are rated at the level 3 or below from the response summary table 54 shown in FIGS. 8(A) and 8(B). Based on such information, the instructor terminal 21 then creates a review subject file 59 as shown in FIG. 13. Here, the symbols A01, A02, etc. respectively denote Units #1, #2, etc. that constitute a lecture named A. The instructor terminal 21 appends to this review subject file 59 the data of a review material file (described below) that was prepared beforehand by the instructor.

FIG. 14 shows an example of a review material file. This review material file 60 has a questionnaire number field 60a, an understanding level field 60b, a review material field 60c, and a comment field 60d, for instance. More specifically, in the review material file 60, different pieces of review material are defined in accordance with the sequential order (i.e., first, second, . . . ) of the questionnaires conducted during a class session, as well as depending on the students' understanding levels. Actually, this review material file 60 does not contain any review material itself, but designates it by a pointer. Each entry of the review material is accompanied by the instructor's comments about its usage. It should be noted that the review material file 60 as described above is produced on a unit-by-unit basis.

A click on a start button 58d shown in FIG. 12 will make the instructor terminal 21 select some relevant data from the review material file 60. The instructor terminal 21 then appends the data to the review subject file 59 and sends both to each student via e-mail. This set of data is collectively referred to as review material provision data. Consider that the review material file 60 is of Unit #1, for example, and that is the first questionnaire conducted in the session. In this case, students who reported the understanding level 2 for Unit #1 must be listed in the review subject file 59 (Recall the foregoing assumption that the level 3 or below is subject to review). Those students will receive such data that contains a pointer for a supplementary material "XXXX" and an accompanying instructor's comment that reads as "See material XXXX." Likewise, students who declared the understanding level 1 will receive data containing a pointer for a program "XXXXXX" and an accompanying comment that reads as "Try this program to review the lessons." The students who received such review material provision data can review their lessons, referring to the indicated review material as well as to the instructor's comment. Here, the body of the indicated review material may be sent from the instructor terminal 21 along with the review material provision data, or stored in the local storage of the student terminals 31, 41, etc.

The instructor may respond to the comments sent from the students, which are summarized in the comment list 57 as shown in FIG. 11, by attaching his/her comments to the above-described review material provision data. He/she can open a screen for creating such a comment attachment by clicking a "comments" button 58c shown in FIG. 12.

Figure 15:
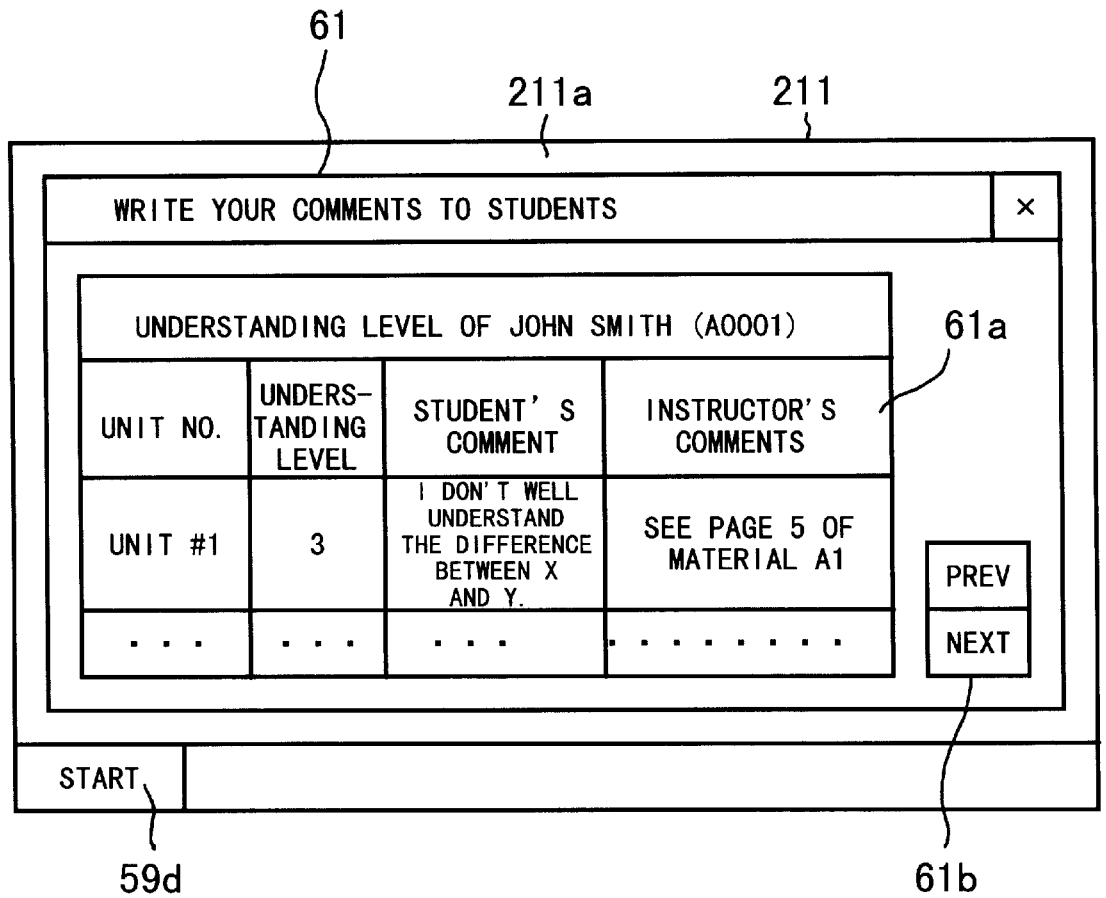
FIG. 15 is a diagram showing an example of an accompanying comment entry screen.

FIG. 15 shows an example of an instructor's comment entry screen. This instructor's comment entry screen 61 provides an instructor's comment space 61a for entering a message in reply to a student's comment concerning a particular unit. The instructor writes the answer to such a student's question, request, complaint, and the like in this instructor's comment space 61a. This facility allows the instructor to send his/her comments to students concerning the units subject to review or any other units. The instructor can call up different comment entry pages by clicking page switching buttons 61b.

Finally, a click on a start button 59d enables the instructor's comments entered as above to be distributed to the relevant students along with the above-mentioned review material provision data.

Figure 16:
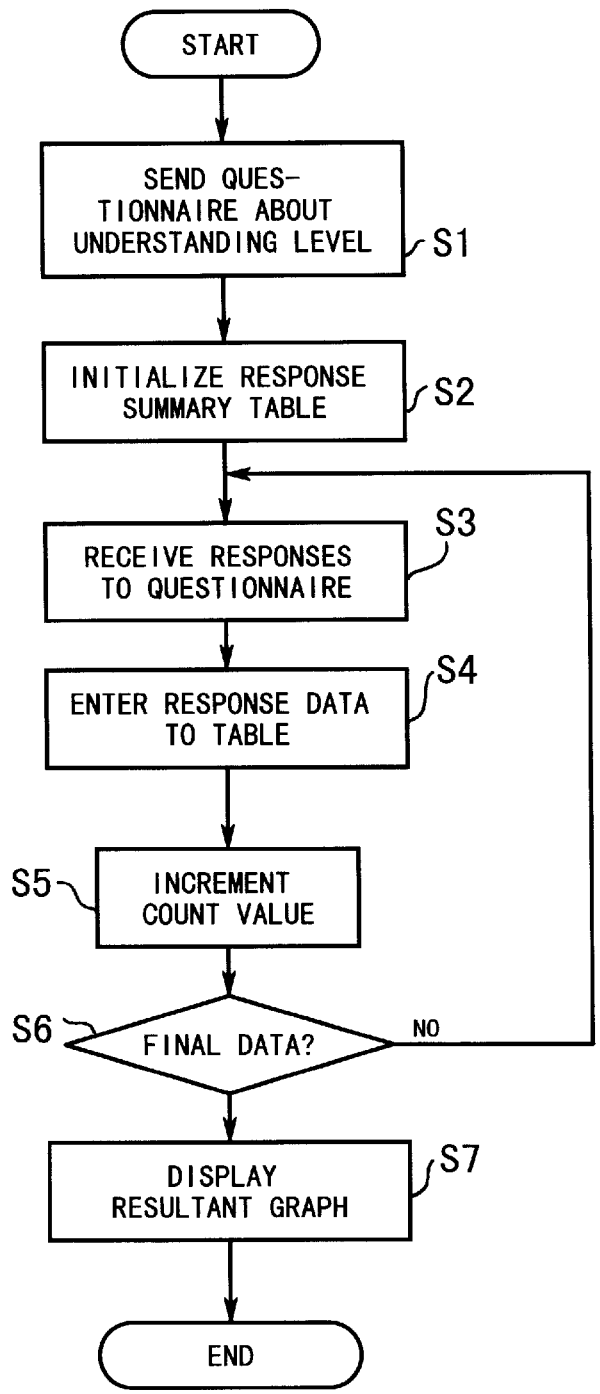
FIG. 16 is a flowchart showing how an instructor terminal executes a process of checking the understanding levels of individual students.

FIG. 16 is a flowchart showing how the instructor terminal 21 executes the above-described process of checking the understanding levels of individual students.

[S1] The instructor operates the instructor terminal 21 to transmit a questionnaire about understanding levels to each student's site.

[S2] The instructor terminal 21 initializes the response summary table by clearing out all entries.

[S3] The instructor terminal 21 receives response data sent from a student in reply to the questionnaire.

[S4] The instructor terminal 21 enters the received response data to a corresponding part of the response summary table, according to the receiving order of the response data.

[S5] The instructor terminal 21 increments a count value corresponding to the understanding level included in the response data processed in step S4.

[S6] The instructor terminal 21 examines whether the response data processed in steps S3–S5 was the final data among those received from the students. If that is the case, the process goes to step S7. Otherwise, the process returns to step S3 to wait for the remaining responses.

[S7] The instructor terminal 21 displays the final count values of the individual understanding levels in the form of a graph.

Figure 17:
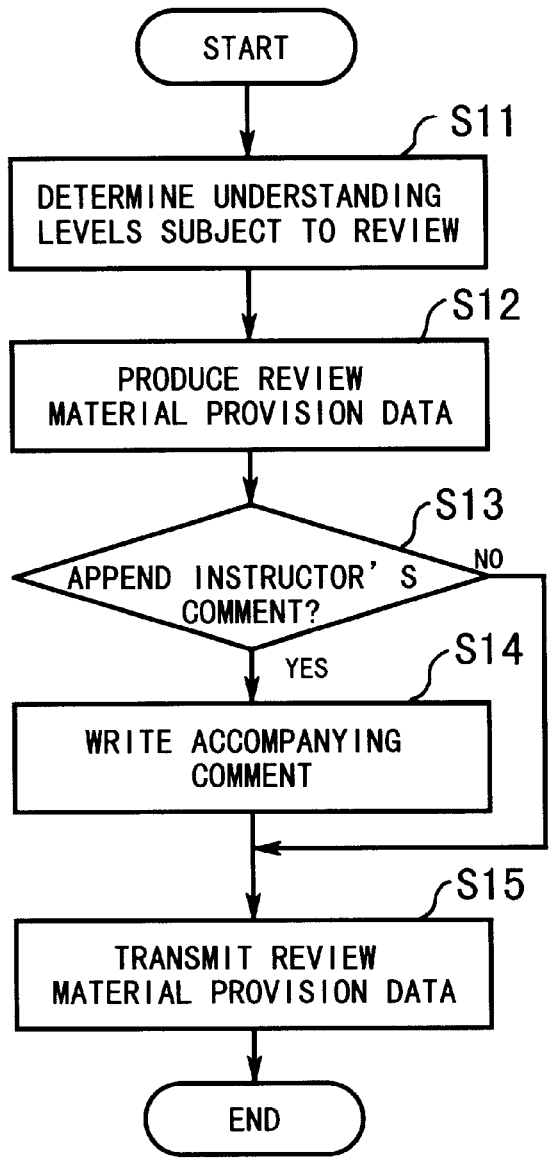
FIG. 17 is a flowchart showing how an instructor terminal executes a process of providing students with review material.

FIG. 17 is a flowchart showing how the instructor terminal 21 executes a process of delivering review material to individual students.

[S11] With the review setting screen 58 of FIG. 12, the instructor determines which understanding levels will be subject to review.

[S12] The instructor terminal 21 produces review material provision data.

[S13] The instructor terminal 21 examines whether or not the instructor has issued a command to append his/her comments to the review material provision data. If he/she has issued such a command, the process advances to step S14. Otherwise, it proceeds to step S15.

[S14] The instructor writes his/her comments in the instructor's comment entry screen 61 of FIG. 15.

[S15] The instructor terminal 21 transmits the review material provision data to each student via e-mail, along with the instructor's comments.

As described above, the present embodiment allows the instructor to initiate a questionnaire about the students' understanding levels concerning a specific class session, and makes the system generate a graph to show the distribution of the understanding levels based on the data returned from the students in response to that questionnaire. From this graph presented at the instructor terminal 21, the instructor can easily have a total grasp of the students' understanding levels about his/her class.

Further, the present embodiment provides review material to some students who declared their understanding levels not greater than a predetermined reference level, thereby giving appropriate supplementary lessons to them. The instructor is also allowed to determine the reference level for selecting the students who need to review, which makes the supplementary action more effective.

Next, the following will explain a question acceptance function to receive questions from students during a class session.

At an appropriate moment in a class session, the instructor may invite the students to ask any questions. In response to this, a student having a question clicks the question button in the operation menu 311*d* displayed on his/her own terminal, say, 31. Then a screen for entering his/her question will appear, and the student enters the question by typing the keyboard. He/she uses an e-mail function to deliver to the instructor terminal 21 a question message, which consists of his/her student ID, classroom ID, contents of the question, and other data. Upon receipt of this question message, the instructor terminal 21 creates a questioner list as discussed below.

FIG. 18 illustrates a questioner list 62, which comprises a student ID field 62*a*, a name field 62*b*, a classroom ID field 62*c*, an outstanding-question flag field 62*d*, and a contents field 62*e*. The outstanding-question flag field 62*d* is used to record a value "1" if the question is unanswered, or a value "0" if the question has already been answered. This flag is set to "1" by the system and rewritten from "1" to "0" when the instructor has made some keyboard operations.

The above questioner list 62 is displayed on the monitor unit 211 of the instructor terminal 21. The instructor designates a questioner seen in this questioner list 62 by operating the mouse, etc. and then responds to the questioner via a voice channel or e-mail facility. When the response to the questioner is done, the instructor resets the corresponding outstanding-question flag 62*d* to "0" by some keyboard operations. The updated questioner list 62 is saved in the local storage (e.g., a hard disk) of the terminal 21, together with some records about the number of questions accumulated on a per-student, per-unit, and per-session bases.

Figure 19:
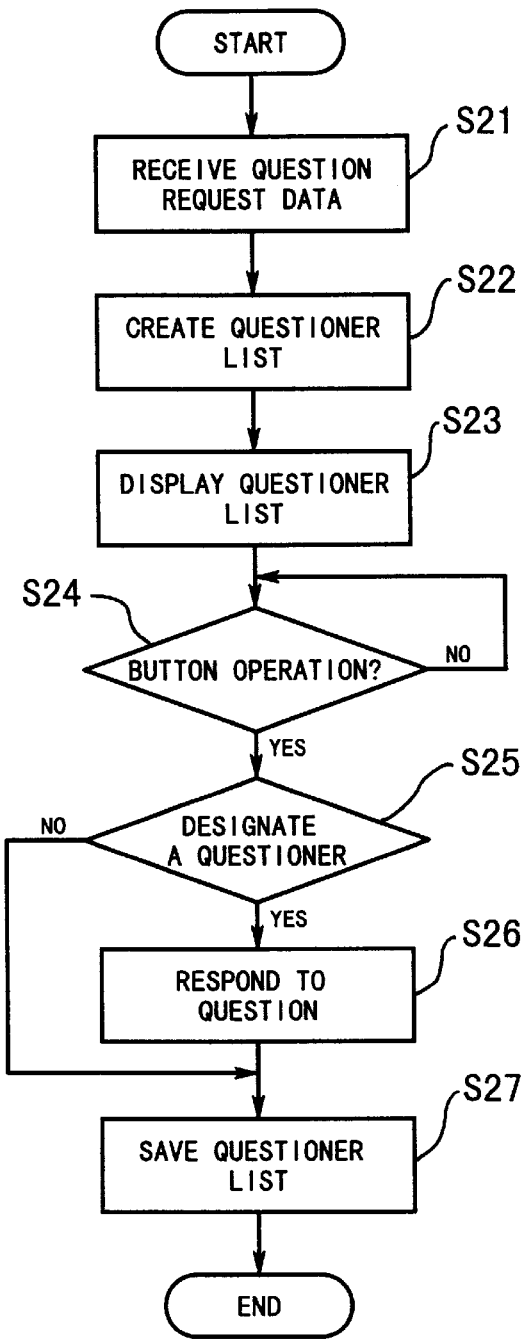
FIG. 19 is a flowchart showing how an instructor terminal executes a process for a question acceptance function.

FIG. 19 is a flowchart showing how the instructor terminal 21 executes a process of the question acceptance function.

[S21] The instructor terminal 21 receives question request data from students.

[S22] The instructor terminal 21 creates a questioner list.

[S23] The instructor terminal 21 displays the created questioner list on the terminal screen.

[S24] The instructor terminal 21 examines whether or not the instructor has pressed a button to designate a particular questioner or to terminate reception of questions. If he/she made such a button operation, the process advances to step S25. Otherwise, this step S24 is repeated.

[S25] The instructor terminal 21 judges whether the button operation found in step 24 is a designation of a particular questioner or not. The process advances to step S26 if it is such a designation. Otherwise, the process skips to step S27.

[S26] The instructor terminal 21 responds to the question from the designated questioner through a voice channel or e-mail facility.

[S27] The instructor terminal 21 saves the questioner list.

The present invention allows the students to freely ask questions, and displays a list of questioners on the screen as described above. This enables the instructor to grasp the students' understanding levels, etc. in more detail, and to provide an appropriate advice to each student at his/her discretion.

While, in the above explanation, the students send their questions in response to the prompt from the instructor, the system can be configured to allow the students to send questions to the instructor on their own demands.

The software for the above-described education system of the present embodiment may be previously installed in the instructor terminal 21 and student terminals 31, 41, etc. Or, alternatively, it can be downloaded from the instructor terminal 21 to the student terminals 31, 41, etc. over the network 10.

The above discussion is summarized as follows. According to the present invention, the network-based education system conducts a questionnaire to survey the students' understanding levels concerning the lecture, collects responses to the questionnaire which are returned from the students, and displays the distribution of the understanding levels described in the responses to the questionnaire. This structural arrangement helps the instructor to have a total grasp of the students' understanding levels about his/her class.

Further, the system provides the students with appropriate review material suitable to their respective understanding levels, which allows better supplementary actions to be taken according to each student's understanding level.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A network-based education system allowing an instructor to give a lecture to a plurality of students via a computer network, comprising:

questionnaire conducting means disposed at a site of the instructor for conducting a questionnaire to survey understanding levels of the students concerning the lecture;

understanding level data displaying means for collecting responses to the questionnaire which are returned from the students and displaying the distribution of the understanding levels described in the responses to the questionnaire;

reference level setting means for enabling the instructor to set, on a monitor screen, a reference level used to resolve the understanding levels;

a review material table defining which review material is relevant to each understanding level; and review material providing means for providing a suitable review material to the students who reported the understanding levels equal to or below the reference level set by said reference level setting means, by consulting said review material table.

2. The network-based education system according to claim 1, further comprising:

student's comment entry means for enabling the students to enter comments about the lecture, and student's comment appending means for appending the comments entered by the students to the response to the questionnaire.

3. The network-based education system according to claim 2, further comprising:

student's comment displaying means for displaying the comments entered by the students on a monitor screen.

4. The network-based education system according to claim 1, wherein said understanding level data displaying means is configured to display the distribution of the understanding levels in graph form.

5. The network-based education system according to claim 1, wherein said review material providing means is configured to provide the review material via e-mail.

6. A computer-readable medium encoded with a computer program for a network-based education system that allows an instructor to give lecture to a plurality of students via a computer network, the computer program being designed to run on a computer used by the instructor in order to cause the computer to function as:

questionnaire conducting means disposed at a site of the instructor for conducting a questionnaire to survey understanding levels of the students concerning the lecture;

review material providing means for indicating review material whose contents are suitable for the individual understanding levels reported by the students in response to the questionnaire conducted by said questionnaire conducting means;

reference level setting means for enabling the instructor to set, on a monitor screen, a reference level used to resolve the understanding levels;

a review material table defining which review material is relevant to each understanding level; and review material providing means for providing a suitable review material to the students who reported the understanding levels equal to or below the reference level set by said reference level setting means, by consulting said review material table.

7. A network-based education method in which an instructor gives a lecture to a plurality of students via a computer network, comprising:

conducting a survey to determine understanding levels of the students concerning the lecture;

collecting responses to the questionnaire which are returned from the students;

displaying a distribution of the understanding levels described in the responses to the questionnaire;

setting a reference level on a monitor screen used to resolve the understanding levels by an instructor;

defining which review material is relevant to each understanding level in a table; and providing a suitable review material to the students who reported the understanding levels equal to or below the reference level set by said reference level setting means, by consulting said table.

* * * * *